Nov. 22, 1960     M. J. KLEIN ET AL     2,961,469
DIMETHYLENETETRABORANE-10
Filed Oct. 9, 1958

TETRABORANE-10

DIMETHYLENETETRABORANE-10

*INVENTOR.*
MORTON J. KLEIN
*BY* IRVINE J. SOLOMON
BEN C. HARRISON

Donald L. Rose

United States Patent Office 2,961,469
Patented Nov. 22, 1960

2,961,469

DIMETHYLENETETRABORANE-10

Morton J. Klein and Irvine J. Solomon, Chicago, and Ben C. Harrison, Evanston, Ill., assignors, by mesne assignments, to Callery Chemical Company, Pittsburgh, Pa., a corporation of Pennsylvania Filed Oct. 9, 1958, Ser. No. 766,267

4 Claims. (Cl. 260—606.5)

This invention relates to dimethylenetetraborane-10 and to a method for its preparation.

Several boron hydrides are known and others have been suspected or tentatively identified. An outstanding characteristic of these compounds is that each member of the series differs from the others not only in its physical properties, but also in structure, reactivity and stability. For this reason, the chemistry of the boron hydrides is not clearly defined and their reactions are relatively unpredictable. Thus, although tetraborane-10, $B_4H_{10}$, was one of the first hydrides of boron to be identified, it is one of the least stable so that its reactions and derivatives are only now being investigated in any detail.

This invention has as one of its chief objects to provide a new derivative of tetraborane-10.

Another object is to provide a method whereby tetraborane-10 is alkylated to produce this new compound.

Other objects will become apparent throughout the following specification and claims.

The basis for this invention lies in the discovery that the reaction of ethylene with tetraborane-10 in the presence of aluminum chloride and carried out between adjacent hot and cold surfaces produces dimethylenetetraborane-10, $C_2H_4B_4H_8$.

Figure 1:
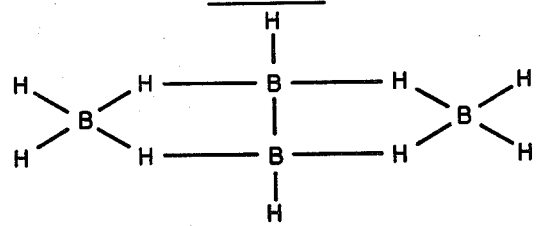
Figure 2:
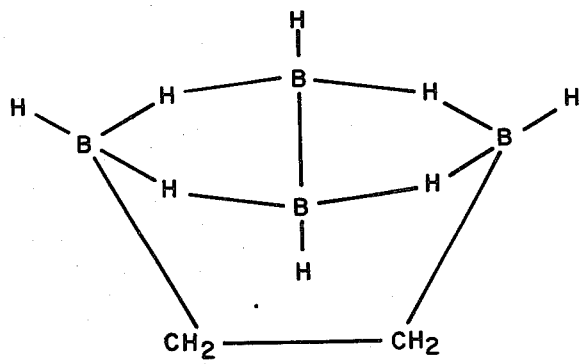

Dimethylenetetraborane-10 is an alkylated tetraborane in which two methylene groups are bridged across two boron atoms. It is a colorless liquid having a vapor pressure of 14.5 millimeters of mercury at 0° C. Figure 1 in the drawing which is part of this specification shows the structure of tetraborane-10, and Figure 2 shows the structure of dimethylenetetraborane-10. It can be seen that the dimethylene bridge in dimethylenetetraborane-10 is bonded across the two boron atoms which in the tetraborane-10 molecule are each attached to two hydrogen atoms. The existence of the bridge-type linkage was shown by a test in which it was found that the products obtained upon oxidation of dimethylenetetraborane-10 with 30% hydrogen peroxide included ethylene glycol. Since boron-carbon bonds are broken by this treatment while carbon-carbon bonds are unaffected, the obtention of the glycol indicated that the molecule contained two methylene groups with each carbon attached to one boron and one carbon. This structure for dimethylenetetraborane-10 has been confirmed by infrared analysis which showed the absence of both $BH_2$ groups and $CH_3$ groups, and the presence of $CH_2$ groups. Further chemical evidence was obtained by reacting dimethylenetetraborane-10 with methanol; the products obtained corresponded to those expected according to the equation.

$C_2H_4B_4H_8 + 10CH_3OH \rightarrow$
 $2(CH_3O)_3B + 9H_2 + (CH_3O)_2BCH_2CH_2B(OCH_3)_2$ Also indicating that the above formula is correct is the molecular weight, which was determined experimentally as 79.2; the calculated value for $C_2H_4B_4H_8$ is 79.3.

Dimethylenetetraborane-10 is obtained as the product of the reaction between ethylene and tetraborane-10, when carried out in the presence of aluminum chloride and in a reactor which comprises adjacent hot and cold walls. The reaction follows the equation $$C_2H_4 + B_4H_{10} \rightarrow C_2H_4B_4H_8 + H_2$$

The temperature of the hot wall should be between about 60° C. and 100° C., and that of the cold wall between about −30° C. and 0° C. The preferred temperatures at present are 100° C. for the hot wall and 0° C. for the cold wall, since the use of these higher temperatures results in a higher conversion without affecting the yield obtained.

The pressure used in the reactor has not been shown to be critical. However, for convenience, atmospheric pressure or somewhat below, i.e., down to about 500 millimeters of mercury, has ordinarily been used as the initial pressure. The pressure in the reactor ordinarily drops as the reaction takes place.

Although the time of the reaction is not of critical import for operability of the method, i.e., there is no known induction period prior to the reaction, it has been found that for the attainment of maximum yields and conversions, the reaction should be stopped when the pressure begins to rise after it has reached a minimum relative to the pressure of the reactants charged, i.e., the initial pressure. The reason for this appears to be that at the minimum pressure point, the rate of the alkylation reaction has decreased and the decomposition reactions which tend to consume tetraborane-10 and dimethylenetetraborane-10 have increased, so that the yield and conversion are reduced by continued operation. This effect appears to be due to the inherent instability of tetraborane-10 and its derivatives and not to the pressure as such, because removal of the hydrogen produced during the reaction does not effect the conversion.

In one test illustrating the method of this invention, a glass reactor consisting of two concentric tubes enclosing an annular space 10 millimeters in diameter, 30 centimeters long, and 400 milliliters in volume, was coated on the inner wall with freshly sublimed aluminum chloride, $AlCl_3$. Tetraborane-10 (23.7 millimoles) and enough ethylene to reach 700 mm. total pressure were distilled into the evacuated reactor and the reactor then sealed. The inner wall was heated to 100° C. and the outer wall was cooled to 0° C. After 40 minutes, during which time the pressure fell from 700 millimeters to 600 millimeters, the pressure began to rise and the reaction was stopped. The reactor was opened and the products separated by low-temperature fractionation. It was found that 16.6% of the tetraborane-10 had been converted; 3.59 millimoles of $C_2H_4B_4H_8$ were obtained, a 90% yield based on the tetraborane-10 consumed.

In other tests, conducted similarly, lower temperatures of both the hot and cold wall resulted in lower conversions. For example, with a hot wall at 60° C. and the cold wall at −23° C., the conversion was 2.7% and the yield 65%. Longer reaction times did not improve the conversions and yields obtained; higher temperatures appeared to have a deleterious effect.

Dimethylenetetraborane-10 has a heat of combustion which is substantially greater than is that of hydrocarbon fuels. Therefore, it may be used in place of ordinary fuels as a heat source and combusted with air or pure oxygen to provide heat for ordinary applications. In such uses, it is particularly desirable in situations where transportation of fuel is a major problem, as in difficultly accessible mountainous terrain. In a simple demonstration is was found that it required substantially less weight of dimethylenetetraborane-10 than kerosene to heat one liter of water 30° C., using air as the oxidizer in both instances.

The high heat of combustion of dimethylenetetraborane-10 makes it especially useful as a high energy rocket engine fuel; when burned with liquid oxygen as the oxidizer it produces more thrust per pound than do other fuels.

According to the provisions of the patent statutes we have explained the principle and mode of practicing our invention, have described what we now consider to be its best embodiments. However, we desire to have it understood that within the scope of the appended claims, the invention may be practiced otherwise than as specifically described.

We claim:

1. Dimethylenetetraborane-10, $C_2H_4B_4H_8$.

2. A method of preparing dimethylenetetraborane-10 which comprises reacting ethylene and tetraborane-10 in the presence of aluminum chloride, in a reaction zone between adjacent hot and cold walls while maintaining said hot wall at a temperature between about 60° C. and 100° C. and said cold wall at a temperature between about −30° C. and 0° C., and recovering the dimethylenetetraborane-10 thus formed.

3. A method according to claim 2 in which said hot wall is maintained at about 100° C. and said cold wall at about 0° C.

4. A method according to claim 2 in which the reaction is stopped when the pressure in the reaction zone reaches a minimum relative to the initial pressure.

No references cited.